No. 700,734. Patented May 27, 1902.
A. B. BUREN.
BURIAL VAULT.
(Application filed Sept. 24, 1901.)
(No Model.)
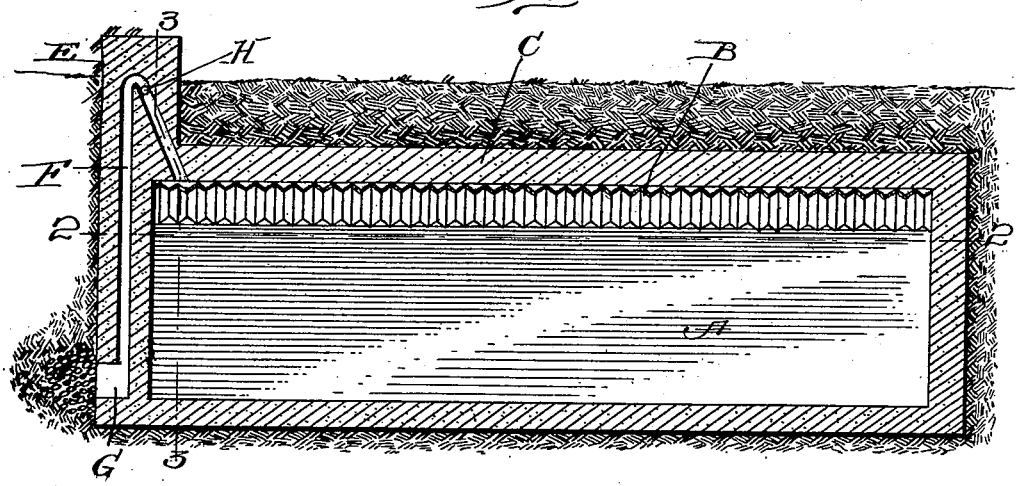
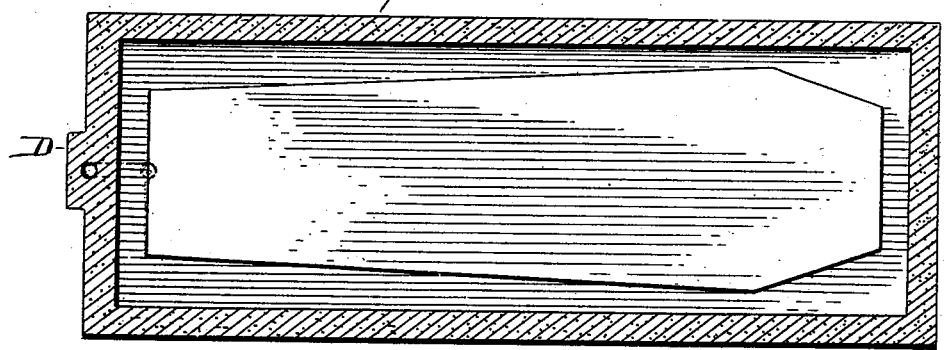
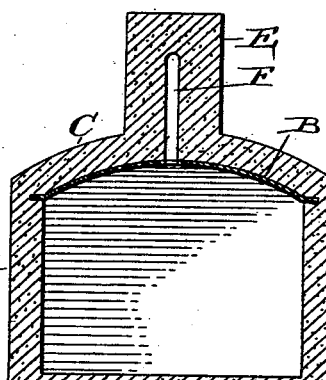
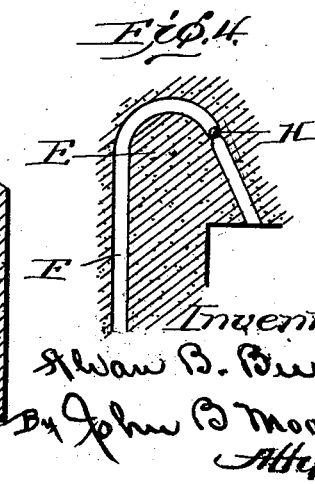
Witnesses:
J. M. Fowler Jr.
Inventor
Alvan B. Buren
By John B. Moon
Atty.
THE NORRIS PETERS CO., PHOTO-LITHO., WASHINGTON, D. C.

UNITED STATES PATENT OFFICE.

ALVAN B. BUREN, OF SALEM, OREGON.

BURIAL-VAULT.

SPECIFICATION forming part of Letters Patent No. 700,734, dated May 27, 1902.

Application filed September 24, 1901. Serial No. 76,399. (No model.)

*To all whom it may concern:*

Be it known that I, ALVAN B. BUREN, a citizen of the United States, residing at Salem, in the county of Marion, in the State of Oregon, have invented a new and useful Concrete Burial-Vault, of which the following is a specification.

My invention relates to vaults for the reception of burial-caskets, and has for its object to provide a permanent and durable vault which will be impervious to moisture and will resist the attacks of burrowing animals, while permitting of a natural ventilation of the interior of the vault and the escape therefrom of the gases caused by the decomposition of the contained body.

To these ends my invention consists in the features of construction and arrangement hereinafter described, and pointed out in the claims.

In the drawings, Figure 1 is a longitudinal vertical section. Fig. 2 is a longitudinal horizontal section on line 2 2 of Fig. 1. Fig. 3 is a transverse vertical section taken on line 3 3 of Fig. 1, and Fig. 4 is an enlarged detail view of a portion of Fig. 1.

A represents the casing-walls of the vault, preferably formed of concrete and of dimensions suitable to receive one or more coffins.

B is a roofing-plate, preferably of metal, having its edges embedded in the side walls of the vault and constituting a support and form for the concrete top C.

One of the end walls of the vault is preferably thickened to form an enlargement, as shown at D, extending the entire height of the vault and projecting upward above the top thereof, as shown at E. The vertical extension E is preferably of greater thickness than the end wall therebeneath and preferably extends to or above the surface of the ground to form a foot or head stone for the grave.

F represents an exhaust-conduit extending from the interior of the vault beneath the extension E upward into said extension a suitable distance and then downward through the end wall of the casing to an exterior opening G, near the bottom of the vault. Within said conduit, preferably in the shorter leg thereof, is arranged a suitable check-valve H, preferably of the ball construction shown, arranged to open to permit egress of the gases from the vault, but to close against the ingress of water or other foreign substance from the exterior. The opening G is preferably protected by a covering of gravel or other porous material, which will prevent the aperture from becoming clogged with earth or clay and which will assist in disseminating the escaping gases.

The conduit herein referred to is preferably molded during the construction of the vault, and if found more convenient the whole vault may be built *in situ*.

Throughout the foregoing specification and in the following claims I have for convenience employed the term "concrete" to describe the material of which the vault is composed; but I wish it to be understood that I have used said term as generic to all compositions, such as cement and the like, adapted to be molded while in a plastic condition.

Having thus described my invention, what I claim, and desire to secure by Letters Patent, is—

1. A concrete burial-vault having an extended portion integral with a wall, a conduit formed within said extended wall establishing communication between the interior and exterior of the vault, and a check-valve in said conduit for preventing the ingress of foreign matter into said vault through said conduit.

2. A concrete burial-vault having an integral upward extension above one wall terminating at the level of the ground, a conduit located within said extension and the wall, extending upward from the interior of said vault into the extension and thence downward through the wall, and terminating at the exterior of the wall near the bottom thereof, and a check-valve located within said conduit; substantially as described.

In testimony whereof I have signed my name to this specification in the presence of two subscribing witnesses.

ALVAN B. BUREN.

Witnesses:
JOHN M. PAYNE,
JOHN A. JEFFREY.